(12) United States Patent
Denter et al.

(10) Patent No.: US 7,442,094 B2
(45) Date of Patent: Oct. 28, 2008

(54) TELECOMMUNICATIONS MODULE

(75) Inventors: Friedrich Wilhelm Denter, Castrop-Rauxel (DE); Hans-Dieter Otto, Wipperfurth (DE); Christine B. Bund, Wuppertal (DE); Cornel Schaub, Wuppertal (DE); Bernd Lindenbeck, Wuppertal (DE)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/545,140

(22) PCT Filed: Feb. 17, 2004

(86) PCT No.: PCT/US2004/005907

§ 371 (c)(1),
(2), (4) Date: Aug. 31, 2006

(87) PCT Pub. No.: WO2004/079869

PCT Pub. Date: Sep. 16, 2004

(65) Prior Publication Data

US 2007/0149004 A1 Jun. 28, 2007

(30) Foreign Application Priority Data

Mar. 3, 2003 (EP) .................................. 03004373

(51) Int. Cl.
*H01R 9/22* (2006.01)
(52) U.S. Cl. .................. 439/719; 439/61; 439/715; 361/769
(58) Field of Classification Search ................. 439/719, 439/715–716, 61; 361/769; 379/93.08, 325
See application file for complete search history.

(56) References Cited

U.S. PATENT DOCUMENTS

| 2,885,603 | A | * | 5/1959 | Rose ........................... 361/815 |
| 3,777,223 | A | * | 12/1973 | Chandler et al. ............. 361/823 |
| 4,134,631 | A | * | 1/1979 | Conrad et al. ................. 439/50 |
| 4,151,580 | A | * | 4/1979 | Struger et al. ............... 361/801 |
| 4,738,632 | A |   | 4/1988 | Schmidt et al. |
| 5,816,854 | A | * | 10/1998 | Baggett et al. ........... 439/540.1 |
| 6,196,869 | B1 | * | 3/2001 | Kay et al. ................... 439/532 |
| 6,729,902 | B2 | * | 5/2004 | Martich ...................... 439/488 |
| 7,092,176 | B2 | * | 8/2006 | Follingstad et al. ......... 359/819 |
| 7,099,340 | B2 | * | 8/2006 | Liva et al. ................... 370/401 |
| 7,324,632 | B2 | * | 1/2008 | Badura et al. ............ 379/88.07 |
| 2003/0013346 | A1 |   | 1/2003 | Perrone et al. |
| 2003/0156389 | A1 |   | 8/2003 | Busse et al. |
| 2004/0022013 | A1 |   | 2/2004 | Badura et al. |

FOREIGN PATENT DOCUMENTS

| EP | 0 909 102 A2 | 4/1999 |
| WO | WO 01/97339 A1 | 12/2001 |
| WO | WO 02/076109 A2 | 9/2002 |

* cited by examiner

*Primary Examiner*—Michael C Zarroli
(74) *Attorney, Agent, or Firm*—Gregg H. Rosenblatt

(57) ABSTRACT

A telecommunications module includes a housing, a plurality of contacts, which are exposed to allow the connection of wires herewith, and a connecting device for connecting at least some of the contacts with other contacts of the telecommunications module, wherein the connecting device is partially accommodated in the housing an d partially extends outside the housing.

18 Claims, 2 Drawing Sheets

TELECOMMUNICATIONS MODULE

CROSS REFERENCE TO RELATED APPLICATIONS

This application is a national stage filing under 35 U.S.C. 371 of PCT/US2004/005907, filed Feb. 27, 2004, which claims priority to European Application No. 03004373.1, filed Mar. 3, 2003, the disclosure of which is incorporated by reference in its/their entirety herein.

TECHNICAL FIELD

The Invention relates to a Telecommunications Module.

BACKGROUND

In the field of telecommunications, those lines, which connect the customers or subscribers with the switch of a telecommunications company, are usually connected via numerous telecommunications modules. The telecommunications modules are located in so-called distribution points. A typical distribution point is a main distribution frame, which is located in the central office of the telecommunications company. Generally, the telecommunications modules connect sections of the telecommunications line with each other, so as to, eventually, connect the subscribers with the switch. A telecommunications module can include a housing and plurality of contacts. Wires, which constitute sections of the telecommunications line, are connected with the contacts. Pairs of two contacts of the telecommunications module, which can be located on opposite sides, are connected with each other in the interior of the telecommunications module. This connection can be disconnected in order to allow the insertion of disconnection plugs, test plugs, protective plugs or protective modules.

Recently, new technologies have evolved in the field of telecommunications, which require additional electronic components to be arranged in the telecommunications line. As an example, ADSL-technology has spread widely in the last few years. In this technology, at least two separate signals are transmitted via one and the same telecommunications line in separate frequency bands. In order to split the combined signal, which is transmitted via one and the same line, so-called splitters are used. These splitters generally comprise suitable filters in order to transmit a first signal of the combined signal to a first output, and a second signal to a second output.

In this context, EP 0 909 102 A2 teaches such a splitter assembly, which is arranged in a main distribution frame. WO 01/97339 discloses a telecommunications module, in which a splitter circuit is arranged in a manner to provide connections between the contacts of the module and the splitter circuit.

SUMMARY

The invention provides a telecommunications module, which is improved with respect to the density of electrical connections.

The telecommunications module includes a housing and a plurality of contacts, which are exposed to allow the connection of wires therewith. Furthermore, the telecommunications module includes a connecting device for connecting at least some of the contacts with other contacts of the telecommunications module. The connecting device is partially accommodated in the housing and partially extends outside the housing.

It is to be noted that the telecommunications module is a module, to which wires can be connected. In this respect, the telecommunications module is comparable to conventional modules, which have a housing accommodating the contacts and any internal electrical connections. Only the contacts for connecting the wires therewith are exposed. Furthermore, a grounding contact can be exposed so as to establish electrical connection with a carrier and eventually to ground. This measure will usually be taken, when the module contains overvoltage protection components, which must be connected to ground in order to divert the energy in the case of overvoltage. However, in conventional telecommunications modules, there are no further components, which are exposed to the outside or even extend outside the housing.

This can be different with protection modules, which usually have tapping contacts for tapping the contacts of a telecommunications module, to which wires are attached. However, the telecommunications module differs from such protection modules in that it has contacts, which are exposed to allow the connection of wires therewith. The contacts can be of any suitable type. E.g., the contacts can be designed as IDCs (Isolation Displacement Contacts). Furthermore, the contacts can be wire wrap pins, around which the exposed ends of wires can be wrapped.

The telecommunications module further includes a connecting device for connecting at least some of the contacts with other contacts of the telecommunications module. The contacts of the telecommunications module can be arranged in two rows. Each contact of the first row can be connected with a contact of the second row. However, in the case of a splitter circuit being integrated in the telecommunications module, a contact of a first row can be electrically connected with two contacts. Each of these two contacts can be arranged in the first or second row. In the case of a single contact being connected with two contacts, the single contact receives or transmits a combined signal, e.g. in ADSL-technology, and the two further contacts, with which connection is established, transmit or receive two "split" signals. The connecting device of the telecommunications module establishes the necessary electrical connections between the contacts. Furthermore, it can contain or carry any necessary electrical components. These can be filters for realizing one or more splitter circuits as well as protection components for the protection against overvoltage or overcurrent. The connecting device can be formed as a printed circuit board (PCB).

The density of electrical connections in a distribution point can be remarkably increased by the telecommunications module, since the connecting device at least partially extends outside the housing of the telecommunications module. Firstly, the telecommunications module can be designed simply and cost effectively by making use of standard housings. In other words, the telecommunications module can employ a housing, which is conventionally used for a telecommunications module, which does not have any or not as many internal electrical components. The housing can be made of plastic. In the telecommunications module the problem of accommodating these additional components, which are necessary due to new technologies such as ADSL, is solved by locating at least a part of these outside the housing. This must be considered highly unconventional, as it is usually desirable to accommodate any components of a telecommunications module within the housing. However, the telecommunications module realizes the advantage of requiring no or almost no changes to a conventional housing by allowing the connecting device to extend outside the housing. This extension can have any direction. In other words, that part of the connecting device, which is arranged outside the housing, can be located at any face or side of the telecommunications module.

By this measure, additional space which is available in a distribution point can be used advantageously. In particular, as previously established, a high density of electrical connections can be maintained by means of the telecommunications module, which comprises an unchanged housing. The available space can be used by allowing the connecting device to extend outside the housing. As a non-limiting example, it can be mentioned that in distribution points the telecommunications modules can be stacked on top of each other. Furthermore, plural telecommunications modules can be arranged side by side. In the telecommunications module, the connecting device can extend from a rear face of the telecommunications module. It has been found that in many types of distribution points, space is available in the depth direction of the telecommunications module. This space is advantageously used when the connecting device extends outside the housing of the telecommunications module in this direction. Thus, a high density in a distribution point can also be achieved in a case, where additional components, such as splitter circuits, are to be incorporated in the telecommunications modules. Furthermore, the necessary electrical connections and/or switches, in order to provide test and measurement access to one or more of the contacts and/or connections in the telecommunications module, can be incorporated therein, particularly in that part of the connection device, which extends from the housing. Furthermore, the connecting device can include some splitter circuits for some of the lines, which can be connected with the telecommunications module, and test and measurement access for other lines.

The effect obtained by the telecommunications module is particularly advantageous, when the extensions of the connection device outside the housing are of similar dimensions as the housing itself. Generally, any shape and size of the connecting device's extension outside the housing serves the desired purpose. However, the connecting device can even be almost as large as the housing itself, so that the space, which is used, is almost doubled.

As mentioned, the connecting device can be a PCB, which allows an efficient formation of the electrical connections and represents a particularly effective base for accommodating any type of electrical components. Furthermore, a "rigid" PCB extending from the housing has advantages with regard to the handling of the telecommunications module.

The housing can have an opening at a rear face, when the contacts, to which wires can be connected, are arranged at a front face. The connecting device can extend through the rear face so as to make use of the space, which is present there. As this space was hardly used in distribution points up to now, the invention shows a way to retain or even increase the density of electrical connections, also with the accommodation of additional components.

The telecommunications module can be combined with a second housing. The telecommunications module is attachable to a front side of the second housing. The connecting device is at least partially accommodated in the second housing. By means of the combination of the second housing with the telecommunications module, the connecting device, which unconventionally extends outside the housing of the telecommunications module, can be safely accommodated and protected from undesirable influences by the second housing. The second housing provides protection for the connecting device, particularly with regard to electric and magnetic influences. Thus, the second housing serves to shield the connecting device. Furthermore, the second housing protects the connecting device from undesirable contact with operators or other objects. Finally, the size of the second housing, particularly in a depth direction can be adjusted in accordance with the size of the connecting device, in particular that part thereof, which extends outside the housing of the telecommunications module.

The second housing can have at least one connector. This connector can be used to connect with the connecting device of the telecommunications module. Furthermore, the connector can be used for connecting with a bus or a similar, suitable electrical connection. By a bus or any other connection, a connection can be established with connectors of further housings, similar to the second housing, in order to establish electrical connection with further telecommunications modules.

This also applies to the possibility of providing the second housing with a PCB. The PCB can represent a backplane, with which one or more connecting devices of telecommunications module be connected, so as to connect these with each other and/or to establish a bus between them. As regards the PCB, it should be mentioned that the PCB can be adapted to receive electrical components, connectors and/or electrical connections formed on the PCB, from both sides. In other words, at first the front side of the PCB can be used to connect with the connecting devices of one or more telecommunications modules. The back side of the PCB can be used to accommodate electrical components, such as filters, protective components, etc. However, the second housing does not necessarily have to be provided with a PCB. Particularly, when the telecommunications modules are splitter modules or connection modules, in any case modules, which do not have a test and measurement access, the printed circuit board of the second housing can be omitted.

In order to create a telecommunications block including two or more telecommunications modules, the second housing can be sized to accommodate more than one telecommunications modules. In this manner, the second housing can form a base for several telecommunications modules. These can, as mentioned above, be connected with each other, e.g. by a bus, by means of connections, which are provided in the second housing. Thus, the telecommunications module can be attachable to the second housing so as to insert the connecting device of the telecommunications module into the second housing and preferably establish electrical connection between the connecting device of the telecommunications module and a connector of the second housing. The connector can be a part of a bus and/or a backplane, preferably in the form of a PCB. Naturally, also other telecommunications modules, which do not necessarily have to have a connecting device extending there from, can be mounted to the second housing. In particular, the latter telecommunications modules can be combined with telecommunications modules as described-above.

Particularly, in the situation, when the second housing is adapted to allow the attachment of more than one telecommunications module, the second housing can comprise a bus for connecting the telecommunications modules with each other and/or a remote device. This device can be a control, a test and measurement, or a monitoring device. Furthermore, plural telecommunications modules can be connected with each other by means of wires, which can be provided at the front side thereof. In particular, this is possible with or without the types of buses, which are described hereinafter and will usually be provided at the rear side of the telecommunications modules.

The second housing can also contain a flat cable for forming a bus and/or the desired electrical connections.

Furthermore, at least one secondary module can be attached to the second housing. Such a secondary module can be an ADSL Module, an ISDN or analog module or modem, a protection module, a test and measurement module, etc. Such a secondary module can be associated with a single or several telecommunications modules. E.g., a test and measurement module can be connected with plural telecommunications modules via a bus provided in the second housing. The test and measurement module can be used to control the test access to a selected one of the telecommunications modules as well as the connections thereof. In particular, the secondary module can be a control module which controls the switches and connections, which are provided in context with the test access provided in a telecommunications module.

The second housing can include at least one guide for guiding the connecting device of the telecommunications module. In this manner, a safe and reliable accommodation of the connecting device in the second housing is achieved, when the telecommunications module is attached to the second housing.

As regards the mechanical connection between telecommunications module and the second housing, cooperating snap means can be provided on the housing of the telecommunications module and/or the second housing.

The second housing can be made of metal so as to provide a rigid basis for one or more telecommunications modules. Furthermore, grounding functions can be performed by the second housing made of metal.

In order to provide a ground connection for protection components, the telecommunications module can have a grounding element. The second housing can, in a front part thereof, have a section, which is in contact with the grounding element of the telecommunications module. It should be noted that the connecting device of the telecommunications module can extend beyond the front part, at which the grounding section is formed, towards the rear of the second housing. Naturally, the grounding element can also be provided at a side or any other part of the second housing and/or can be in contact with a side or any other part thereof.

Thus, a ground connection can be established via the grounding element of the telecommunications module and the second housing. This enables any current, which is induced in contacts of the telecommunications module, to be diverted to ground. E.g., shielding wires, which shield cables, which are adapted for the transmission of high data rates, can be terminated at the contacts of the telecommunications module. The induced current can be diverted to ground by connecting the grounding element of the telecommunications module with those contacts, which are used for terminating shielding wires. Furthermore, protection components can be present in the telecommunications module. When these are activated, the induced current can also be diverted to ground on the above-described path.

The second housing can also be made of plastic, which allows effective mass production and all necessary functions to be formed.

The second housing can have wire guides so as to manage the wires, which are connected with the contacts of the telecommunications module.

The second housing can also have at least one coding section. Such a coding section allows specific information regarding one or more specific telecommunications modules to be formed on the second housing. In this manner, the handling is improved, and changes in the electrical connection, if necessary, can be facilitated.

The second housing cannot only form the basis for a block including plural telecommunications modules. It can also be mountable to a carrier, which can be provided at a distribution point in the field of telecommunications. In this way, an integral basis for a telecommunications block is formed. The distribution point can be any type of distribution point in the field of telecommunications. E.g., it can be a main distribution frame, a co-location distribution point or a cable cabinet. Any of these distribution points can be provided indoors or outdoors.

In particular, the second housing can be designed as a back mount frame, which is mountable to a frame, rack or carrier of a distribution point, such as a main distribution frame, a cable cabinet or a similar distributor.

As regards the second housing in general, the invention can also be seen in the provision of this second housing. The second housing is in that it allows the attachment of one or more telecommunications modules and is adapted to accommodate at least one component, in particular, a connecting device, extending outside the housing of the telecommunications module. Thus, the second housing comprising one or more features as mentioned-above, can be provided with or without one or more telecommunications modules as described-above.

BRIEF DESCPRIPTION OF THE DRAWINGS

Hereinafter, the invention will be described by means of a non-limiting example with reference to the drawings, in which.

DETAILED DESCRIPTION

Figure 1:
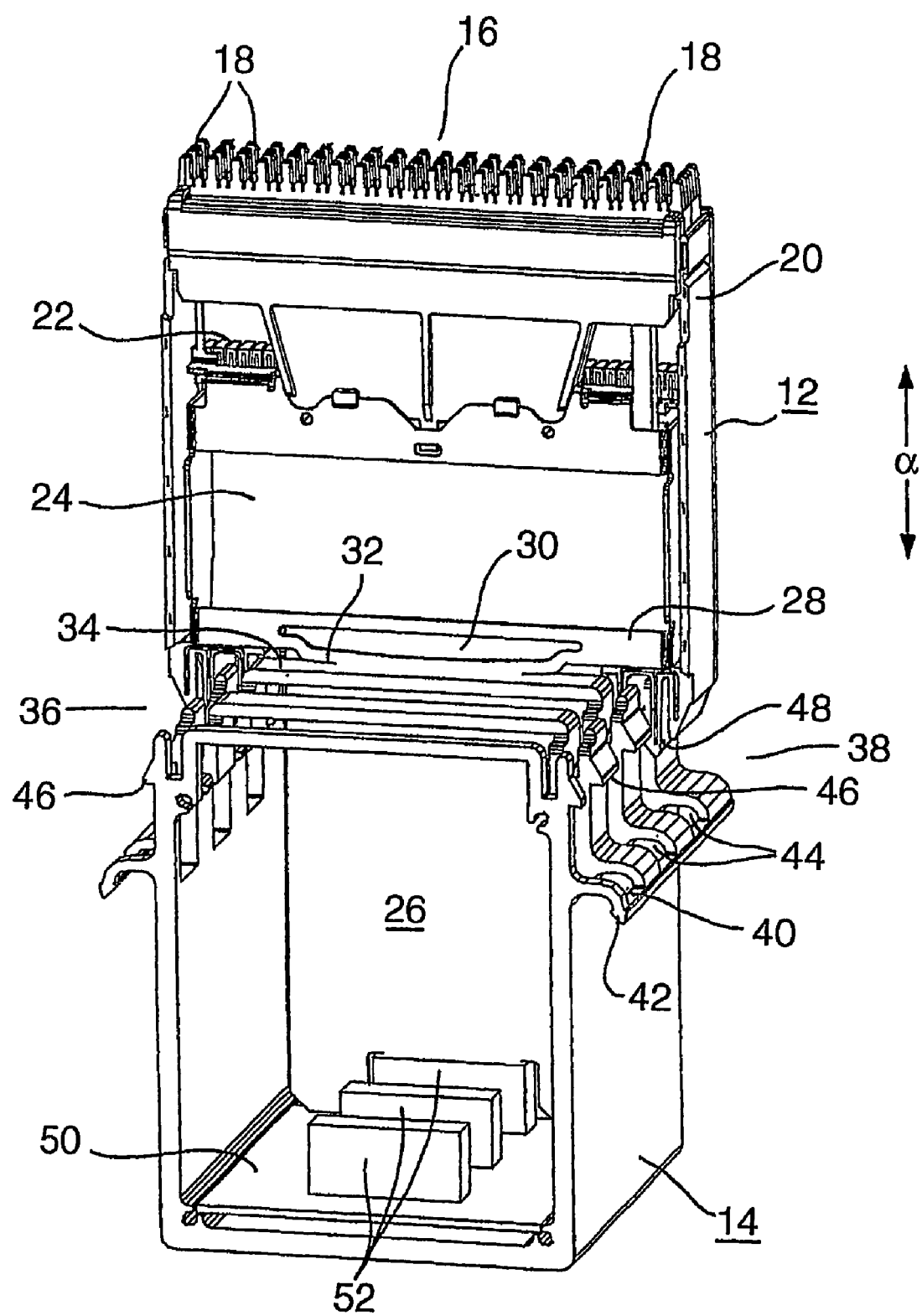
FIG. 1 shows a perspective view of a partially cut-away telecommunications module attached to a second housing.

FIG. 1 shows in a perspective view an assembly of a telecommunications module 12 and a second housing 14. The assembly can be seen as a part of a telecommunications block which can be formed by, firstly, the second housing 14 as shown in the drawing. This second housing 14 is adapted to receive a few, e.g. three telecommunications modules 12. However, the second housing 14 can have any suitable dimensions, e.g., it can be adapted to accommodate ten telecommunications modules 12. A block formed by the second housing and ten telecommunications modules corresponds, as regards its height and width, to a conventional telecommunications block. However, as will be described in detail below, the assembly is extended in the depth direction a so as to make use of space, which is usually present at distribution point in the mentioned direction.

At a front face 16, the telecommunications module has contacts 18, to which wires can be connected. In the interior of a housing 20, each contact 18 is connected with one or more other contacts. In the case shown, these connections are, among others, established by means of suitable connectors 22 arranged on a printed circuit board (PCB) 24. Any components, in the case shown the connectors 22 and the PCB 24, are considered the connecting device of the telecommunications module. As mentioned-above, the connecting device can have any type of electrical components, which are not shown in the drawing. With regard to its size, the housing 20 of the telecommunications module 12 is comparable with a conventional housing. However, the conventional housing is not sized to accommodate the necessary electrical components for realizing splitter circuits, etc. without reducing the capacity of the telecommunications module. In other words, the conventional telecommunications module can only accommodate very few electrical components, which means that only few electrical connections between the contacts can be realized. Accordingly, only few contacts 18 could be used for the connection of wires therewith.

In the telecommunications module, the space behind the housing 20 of the telecommunications module 12 is utilized. In particular, the rear part 26 of the PCB 24 extends from the rear of the telecommunications module 12 outside the housing 20 and into the second housing 14. In the embodiment shown, the telecommunications module 12 comprises a grounding element 28, in which a slot 30 is provided in a rear part, so as to create a web 32, which will "give" in the direction α. In the attached state shown in FIG. 1, the web 32 is in contact with bridges 34 formed in the front part of the second housing 14. In the case shown, the second housing 14 is made of metal so that it can serve to divert any current, which flows in the case of overvoltage, to ground. The second housing 14 can be formed by extrusion or casting of a metal with the cross section shown in FIG. 1. Suitable machining, particularly cutting, will be performed in a front part thereof, in order to create the bridges 34. At the sides, a left 36 and a right side 38, wire guides 40 are provided in the form of a lug 42, which initially runs along the sides 36, 38. Openings 44 are provided in the lug 42 in order to allow wires, which run behind the lug 42, to be guided through one of the openings 44. In this manner, all those wires which are connected with a particular module, can be guided towards the front side of the telecommunications module 12. The telecommunications module 12 can have openings of wire guides (not visible in the drawing) arranged in a row along the sides in direction α. These openings are each associated with a particular contact 18 or a pair of contacts 18, so that the wires can be guided to the contacts 18 in a reliable manner. It should be mentioned that that part of the telecommunications module, which comprises the contacts at the front side, any necessary connections as well as the connecting device 24 can be removed from the housing. The remaining housing in this case has a box like structure with two side walls, a top and a bottom wall, which can comprise, as shown in more detail in FIG. 2, wire guides.

In the case shown, the second housing 14 comprises lateral projections 46, which serve to lock complementary projections of the telecommunications module 12. In particular, in the case shown, the housing 20 of the telecommunications module 12 comprises, in its rear part, two latch hooks 48, one on each side, which are adapted to interlock with the projections 46. This allows a reliable mechanical connection of the telecommunications module 12 with the second housing 14. In particular, this connection can be considered as a snap connection. As regards the lug 42, it should be mentioned, that this lug can be used to attach a cover plate to the second housing 14, which can be adapted to cover one or more telecommunications modules 12. As regards the bridges 34, it should be noted that these can be used to apply information such as coding information with regard to specific telecommunications modules, thereto.

Generally, the second housing 14 shown in the drawing, has an essentially box-like structure. However, as described above, certain openings are provided in a front part thereof. It should be noted that the second housing 14 can have an open front from the beginning so as to adapt a trough-like structure. As will be apparent to those skilled in the art, the means for mechanically attaching one or more telecommunications modules as well as the wire guides can readily be formed on such a trough.

In the rear part of the second housing 14, a PCB 50 of the second housing can be seen. In the case shown, several connectors 52 are provided on the PCB 50. As indicated with regard to the rear part 26 of the connecting device 24 shown in the drawing, this can be inserted into a connector 52 so as to establish electrical connection. In this manner, plural telecommunications modules 12 can be connected with the PCB, which can form a bus, which is connected with several telecommunications modules. In a similar manner, PCB 50 may be replaced by or additionally comprise a flat cable to form a bus connected with the several telecommunications modules. In the case shown, the connectors 52 are provided on a front face of the PCB 50. However, with an adapted design of the second housing 14 and/or an adapted position of the PCB 50, also the rear face of the PCB 50 could be provided with electrical components of any suitable type. Furthermore, the PCB 50 or any other device connecting plural telecommunications modules with each other, can be used to provide a power supply to the modules. The power supply might be necessary for switching operations which are required in connection with test and measurement access to a selected connection in the telecommunications module.

Figure 2:
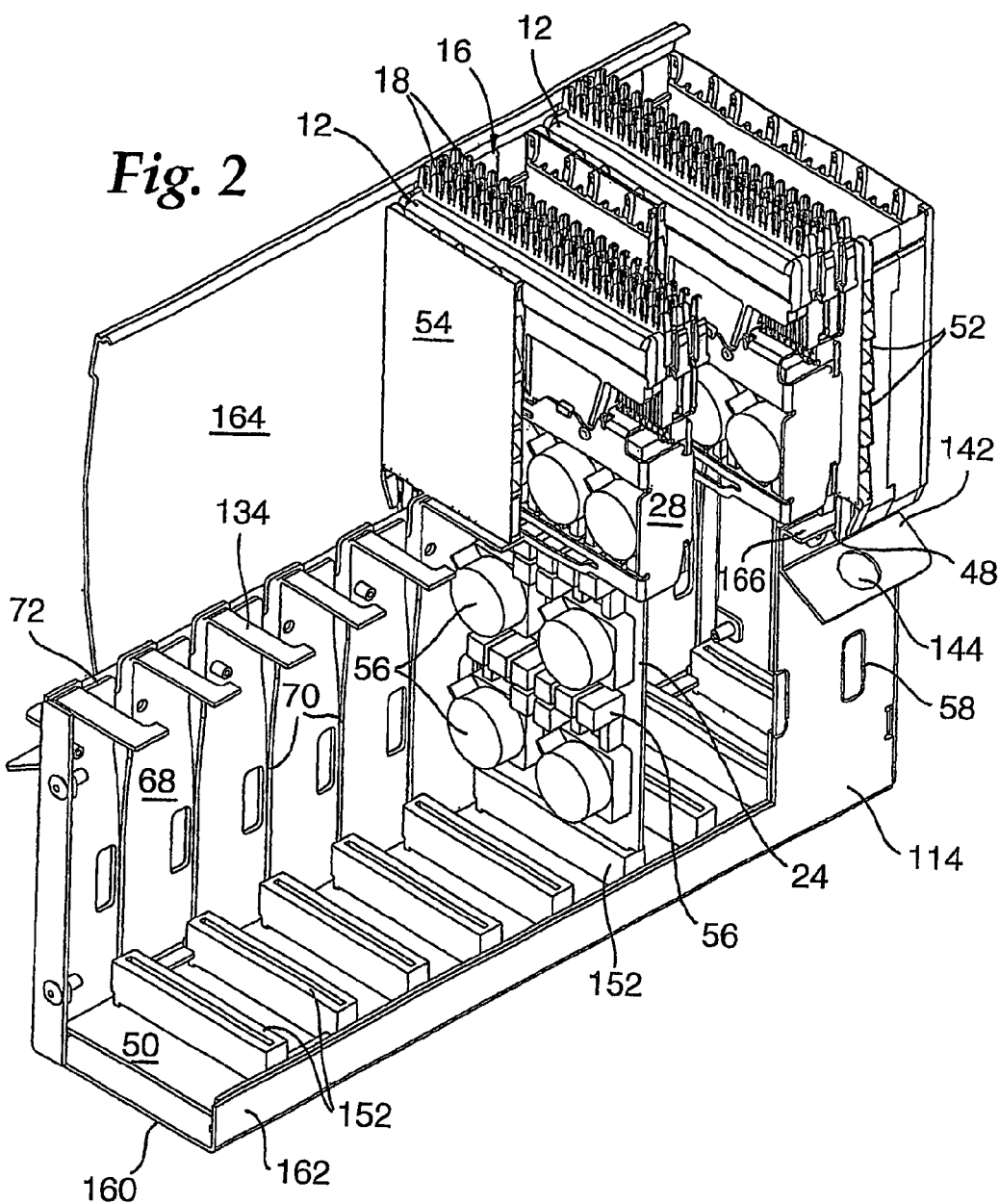
FIG. 2 shows a perspective and partially cut-away view of a telecommunications module attached to a second embodiment of a second housing.

FIG. 2 shows a perspective and partially cut-away view of, in the case shown, two telecommunications modules 12 attached to a second embodiment of a second housing 114. Firstly, in addition to FIG. 1, the openings 52 of wire guides 54, which are provided on the telecommunications modules 12, are visible. As will be apparent to those skilled in the art, the wire guides are formed with substantially arc-shaped configurations in plate-like members 54 (a part of which is visible in the left part of FIG. 2). The plate-like members are, in the embodiment shown, formed at a top and/or a bottom face of the telecommunications modules 12. As mentioned, contacts 18 are exposed at the front face 16. For the sake of explanation, typical electrical components 56, which can be present on the printed circuit board 24, are shown in FIG. 2. As can be seen in the lower part of FIG. 2, the printed circuit board 24 is, in the case shown with a narrowed part thereof, inserted into a connector 152 provided in a rear part of the second housing 114. The second housing 114 shown in FIG. 2 is made of several parts of sheet metal. Generally, the shape of the second housing 114 is trough-like with a bottom 160 and side walls 162. It is to be noted, that the right side wall is cut-away in a front part thereof. A member, which is substantially U-shaped in cross section, is attached to each of the side walls 162 in a front part thereof, so as to constitute a lug 142 including openings 144. In a manner corresponding to that shown in FIG. 1, wire guides are formed in that wires can be guided through the openings 144 and into the openings 52 of the telecommunications module 12. The connection between the member forming the lug 142 and the side wall 162 can, as well as any of the connections described-below, formed by means of rivets.

In the shown embodiment, bridges 134 are formed in a front part of the second housing 114 extending from a side wall in an inward direction, so as to establish electrical connection with the grounding element 28 of the telecommunications module. Finally, a cover 164 is indicated in FIG. 2, which can be engaged with the second housing 114, e.g. via the lug 142, as well as a suitable retaining portion of the telecommunications modules 12. A similar cover 164 can be provided on the right side according to FIG. 2. The provision of one or more covers leads to an integral appearance of the entire assembly and protects the components thereof as well as the wires connected therewith. In the embodiment of FIG. 2, the latch-hooks 48 of the telecommunications module 12 engage with a forward leg 166 of the member, which also contains the lug 142. It is to be understood that this member can be formed all along one or two side walls.

In the case shown, the side walls comprise guides 70 for guiding the printed circuit board 24. The guides are formed between additional sections of side walls 68 which are spaced apart from each other a certain distance in a front part, in order to facilitate the insertion of the connection device 24. In the rear part, the guide 70 is adapted to accommodate the printed circuit board 24 between the edges of the side wall sections 68. Finally, a coding section 72 is provided at the front end of these sections. This coding section 72 generally provides a stop for the telecommunications module attached to the second housing. This prevents the telecommunications modules from being shifted and leads to a clear relationship between a specific connector 152 and a specific telecommunications module.

In the case shown, the side walls are provided with openings 58. These openings can be provided in order to allow access to the connecting device 24, e.g. by a plug or complementary connector, which can be inserted to the opening 58. In this context, the entire content of the application entitled "Telecommunications Module and Combination including at least one Telecommunications Module", in which the provision of connectors on at least one of the top, bottom and side faces of the telecommunications module is described and which is filed simultaneously, is incorporated herein by means of the reference. In particular, in connection with the telecommunications module as described herein, the top, bottom and side faces are to be construed to the effect that they also include the corresponding faces of the connecting device 24 including that part, which extends outside the housing of the telecommunications module. In particular, a combination of the subject matter of the above referenced application and the present disclosure is to be construed as a part of the invention.

Figure 3:
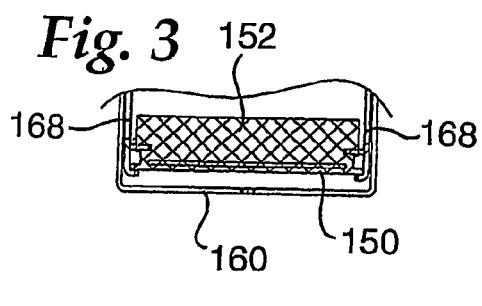
FIG. 3 shows a sectional view of a part of the second housing shown in FIG. 2.

FIG. 3 shows a sectional view of a rear part of the second housing 114 shown in FIG. 2. In the vicinity of the bottom 160, two inner walls 168 are bent slightly inwards so as to support the printed circuit board 150 and/or the connector 152 arranged in this area.

Figure 4:
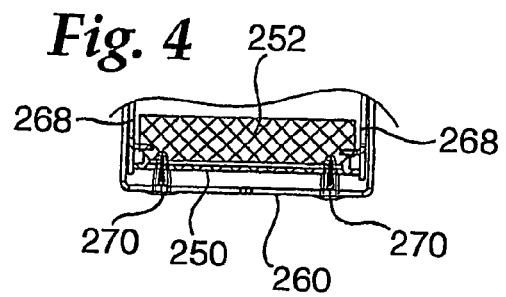
FIG. 4 shows a view corresponding to that of FIG. 3 of a third embodiment of the second housing.

FIG. 4 shows an alternative design. In this case, the printed circuit board 250 and/or the one or more connectors 252 are supported by one or more, in the case shown two, rivets 270. These extend from the bottom 260 towards the printed circuit board 250 and/or the connector 252. In addition, a further inner side wall 268 is slightly bent in an inwards direction on both sides so as to define the position of the printed circuit board 50. As can be seen in the front part of FIG. 2, the bent section of the inner side wall 68 is located between two connectors 152 and thus prevents shifting of the printed circuit board 50 including the connectors.

The invention claimed is:

1. A telecommunications module including a first housing and a plurality of contacts, which are exposed to allow the connection of wires therewith and which further include a connecting device for connecting at least some of the contacts with other contacts of the telecommunications module, wherein the connecting device is partially accommodated in the first housing and at least partially extends outside the first housing; further comprising a second housing, wherein a front side of the telecommunications module is attached to the second housing, and wherein the connecting device is at least partially accommodated in the second housing; and wherein the telecommunications module includes a grounding element and wherein the second housing includes, in a front part thereof, a section that contacts the grounding element.

2. The telecommunications module in accordance with claim 1 wherein the extension of the connecting device outside the first housing is of substantially the same dimensions as the housing.

3. The telecommunications module in accordance with claim 1, wherein the connecting device is a printed circuit board.

4. The telecommunications module in accordance with claim 1 wherein the first housing has at least one opening at a rear face, from which the connecting device extends.

5. The telecommunications module in accordance with claim 1 wherein the second housing includes at least one connector.

6. The telecommunications module in accordance with claim 1 wherein the second housing includes at least one printed circuit board.

7. The telecommunications module in accordance with claim 1 wherein the second housing is sized to accommodate more than one telecommunications module.

8. The telecommunications module in accordance with claim 1 wherein the second housing has at least one bus for connecting at least two telecommunications modules.

9. The telecommunications module in accordance with claim 1 wherein the second housing includes a flat cable.

10. The telecommunications module in accordance with claim 1 wherein the second housing contains at least one secondary module, such as an ADSL-, SDSL-, ISDN- or analog module or modem.

11. The telecommunications module in accordance with claim 1 wherein the second housing includes at least one guide for guiding the connecting device of the telecommunications module.

12. The telecommunications module in accordance with claim 1 wherein at least one of the first housing of the telecommunications module and the second housing comprise snap means for attaching the telecommunications module to the second housing.

13. The telecommunications module in accordance with claim 1 wherein the second housing is made of metal.

14. The telecommunications module in accordance with claim 1 wherein the second housing is made of plastic.

15. The telecommunications module in accordance with claim 1 wherein the second housing has wire guides.

16. The telecommunications module in accordance with claim 1 wherein the second housing has at least one coding section.

17. The telecommunications module in accordance with claim 1 wherein the second housing is mountable to a carrier of a distribution point in the field of telecommunications.

18. The telecommunications module in accordance with claim 1 wherein the second housing is designed as a back mount frame.

* * * * *

UNITED STATES PATENT AND TRADEMARK OFFICE
CERTIFICATE OF CORRECTION

PATENT NO. : 7,442,094 B2
APPLICATION NO. : 10/545140
DATED : October 28, 2008
INVENTOR(S) : Friedrich W. Denter It is certified that error appears in the above-identified patent and that said Letters Patent is hereby corrected as shown below:

Title page,
Item [22], PCT Filed, delete "Feb. 17, 2004" and insert -- Feb. 27, 2004 -- therefor.
Item [30], Foreign Application Priority Data, delete "03004373" and insert
-- 03004373.1 -- therefor.

Column 8,
Line 33, after "members" delete "54".

Signed and Sealed this

Twenty-fourth Day of March, 2009

JOHN DOLL
*Acting Director of the United States Patent and Trademark Office*